Feb. 20, 1968    P. P. WEGGEMAN    3,369,741
VALVE ASSEMBLY RETAINING MEANS
Filed May 31, 1966

INVENTOR.
PHILIPPUS P. WEGGEMAN

3,369,741
VALVE ASSEMBLY RETAINING MEANS
Philippus P. Weggeman, Caracas, Venezuela, assignor to Gulf Oil Corporation, Pittsburgh, Pa., a corporation of Pennsylvania
Filed May 31, 1966, Ser. No. 554,006
11 Claims. (Cl. 230—228)

This invention relates generally to reciprocating piston machines, particularly gas compressors of the type having removable inlet and discharge valve assemblies, and more particularly to improvements in means for retaining said valve assemblies in their valve seats.

The inlet and discharge valve assemblies of these machines must be removed periodically for maintenance. Therefore, removable valve retaining means are provided which maintain the valve assemblies seated in their valve seats, and also permit minor adjustments to be made in the position of the valve assemblies to take up normal wear. Heretofore, such retaining means included a threaded valve cover set screw which engaged the valve assembly and maintained the same in its valve seat. The set screw had its front end engaging the valve assembly, and extended through the manifold space and the valve cover. Thus, the screw could be turned from the outside of the valve cover. However, a portion of the threads of the set screw was within the manifold space.

As is known, compression of a gas is accompanied by an increase in its temperature. For example, compressors may work at a pressure of 2200 pounds per square inch and 360° F. continuously. Consequently, the discharge valve, in particular, is subjected to elevated temperatures which tend to destroy natural and synthetic lubricants including those on the set screw, as well as cause galling of the metal components, making it difficult to rotate the threaded retaining rod, and to remove the valve assembly when desired, or to make those minor adjustments periodically required. Under these high working pressures and operating temperatures, natural and synthetic lubricants have failed to maintain the threaded rod sufficiently lubricated to permit it to be easily rotated.

Accordingly, an object of the present invention is to provide an improved valve assembly retaining means which avoids the above-described difficulties.

Another object is to provide an improved retaining means which permits minor adjustments to be made in the position of the valve assembly while the compressor is operating.

Still another object is to provide an improved retaining means whose operation is not impeded by the high working pressures and temperatures of gas compressors.

In accordance with the present invention, an improved valve assembly retaining means is provided comprising a rod having one end in engagement with the valve assembly and the opposite end disposed exteriorly of the valve cover. Means is provided for slideably supporting the rod in axial alignment with the valve assembly. Means disposed exteriorly of the valve cover is provided for forcibly urging the rod into engagement with the valve assembly, thereby maintaining the valve assembly seated. The rod has a smooth outer cylindrical surface and is, therefore, slideable relative to the supporting means toward and away from the valve assembly. The sliding movement of the rod is accomplished without rotation of the rod. Inasmuch as the urging means is disposed externally of the manifold, it is completely protected from the high working pressures and temperatures within the compressor cylinder, and therefore stays lubricated.

The above and other objects and advantages of the present invention will in part become apparent and will in part be pointed out in the following detailed description, reference being had to the accompanying drawing forming a part thereof, in which.

Figures 1, 2:
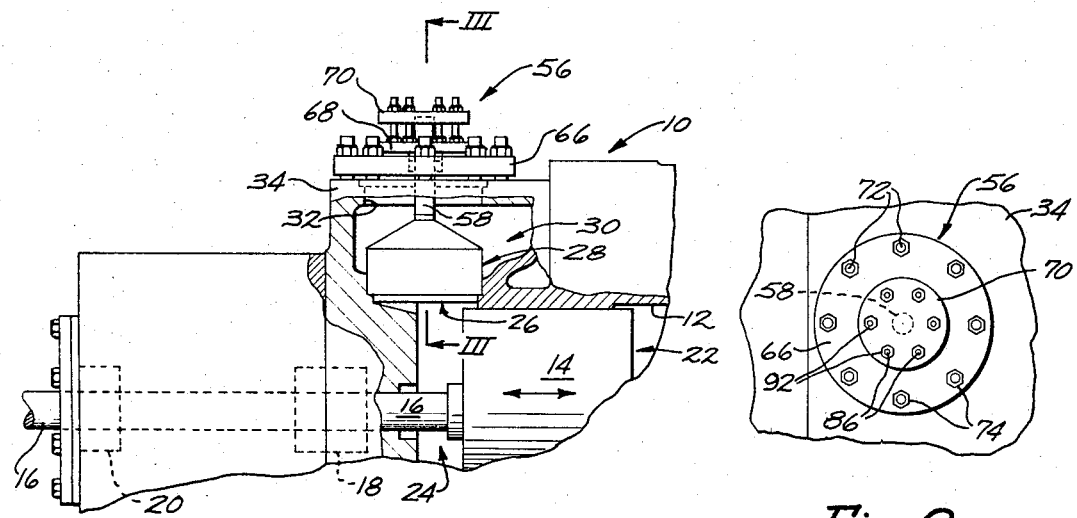
FIG. 1 is a fragmentary side view of a compressor, with parts broken away and in cross-section, illustrating the valve retaining means of the invention.
FIG. 2 is a fragmentary plan view of the valve retaining means of the invention.
Figure 3:
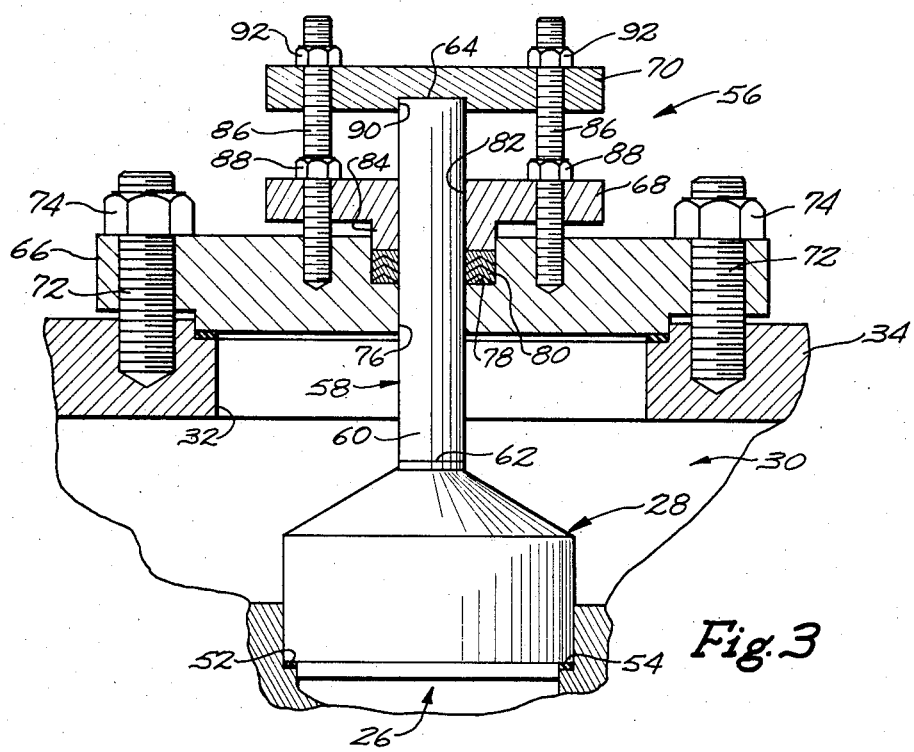
FIG. 3 is a cross-sectional view, taken along the line III—III of FIG. 1.

Referring now to FIG. 1, there is illustrated a conventional reciprocating piston compressor indicated generally by the numeral 10, and comprising a cylinder 12 containing a piston 14. The piston 14 is connected to a piston rod 16 extending through rod guides 18, 20 to a main drive shaft (not shown). The cylinder 12 includes a discharge opening 26 having a discharge valve assembly 28 of any suitable type associated therewith. It will be understood that compressor 10 comprises a plurality of cylinders each having a piston and intake and discharge valves, one valve only being shown for purposes of illustrating as the other valves are the same as or similar to the one shown. The compressed gas is discharged through the valve assembly 28 into a manifold 30 for transfer to a storage tank (not shown), or any other use.

The discharge valve assembly 28 is removable through an access opening 32 provided in an outer wall 34 of the compressor 10.

The discharge opening 26, provided at one end of the cylinder 12, is surrounded by an annular shoulder 52. An annular gasket 54 is clamped between the valve assembly 28 and the annular shoulder 52 to prevent leakage of gas past the periphery of the valve assembly 28.

Valve assembly 28 is maintained in engagement with the annular shoulder 52 by retaining means 56. The retaining means 56 comprises, in general, a retaining rod 58 having first end 60 disposed in the manifold 30 and engaged with an upper surface 62 on the valve assembly 28. The retaining rod 58 has a second end 64 disposed outside of the valve cover or closure plate 66. A sealing plate 68 serves as means for slideably supporting the retaining rod 58 in axial alignment with the valve assembly 28. An urging plate 70 engages the opposite end 64 of the retaining rod 58 to urge the same into engagement with surface 62, thereby maintaining the valve assembly 28 in engagement with the annular shoulder 52.

Plate 66 overlies the access opening 32 and is secured to the outer wall 34 by means of a plurality of threaded studs 72 and nuts 74. The studs and nuts are secured to the outer wall 34 and project outwardly therefrom, and therefore are not exposed to the high pressures and temperatures of the gas in discharge manifold 30. The closure plate 66 has a clearance opening 76 through which the retaining rod 58 is freely slideable. The closure plate 66 is also provided with an annular recess 78 in which there is positioned any suitable sealing material 80. Sealing material 80 preferably comprises chevron type packing, and is preferably formed from tetrafuoraethylene polymer sold under the trademark Teflon. This material is preferred since it provides the necessary seal and yet permits the retaining rod 58 to slide when minor adjustments in the position of the valve assembly 28 are required.

The sealing plate 68 is provided with a clearance opening 82 receiving the rod 58, and an annular hub 84 which projects into the annular recess 78 and engages the sealing material 80. A plurality of threaded rods 86 are secured to the closure plate 66 and project outwardly therefrom through suitable threaded openings in the sealing plate 68. A plurality of nuts 88 are threaded onto the threaded rods 86 and engage the sealing plate 68 to urge the same into engagement with the sealing material 80 thereby providing the necessary seal.

The urging plate 70 is provided with a circular recess 90 which receives the opposite end 64 of the retaining rod 58. The threaded rods 86 extend through suitable threaded openings in the urging plate 70 and receive nuts 92 which force the urging plate 70 into engagement with the retaining rod 58. Consequently, when the nuts 92 are rotated in the appropriate direction, the plate 70 and hence the retaining rod 58 is forcibly urged into engagement with the valve assembly 28.

Retaining rod 58, unlike the prior art, has a smooth cylindrical outer surface whereby it is freely slideable axially toward and away from the valve assembly 28. Consequently, in the event the valve assembly 28 works loose, it may be easily tightened simply by rotating the nuts 92 in the appropriate direction. Since the threaded rods 86 are disposed externally of the manifold 30, they are protected from the high temperatures of the working fluid and are, at all times, in condition such that the nuts 92 may be readily turned to tighten down or loosen the valve assembly 28 relative to the annular shoulder 52.

In the event gas leaks past the sealing material 80, it is a simple matter to further compress the sealing material 80 by rotating the nuts 88 in the appropriate direction. Consequently, movement of the rod 58 for the purpose of tightening or loosening the valve assembly 28 and movement of the sealing plate 68 for the purpose of providing a good seal between the rod 58 and the sealing material 80 are performed independently of one another.

In the event the valve assembly 28 is to be removed, the nuts 74 are removed whereupon the closure plate 66, the sealing plate 68, the urging plate 70 and the retaining rod 58 are removed as a unit. Removal of the valve assembly 28 through the access opening 32 is now made possible. When the valve assembly 28 has been serviced and reinstalled in the opening 26, the retaining means 56 is again applied to the access opening 32. It should be noted that the retaining rod 58 will be automatically positioned in alignment with the valve assembly 28.

While the invention has been described in some detail above, it is to be understood that the protection granted is to be limited only within the spirit of the invention and the scope of the following claims.

I claim as my invention:

1. In combination, an inner wall formed with an opening, an outer wall in spaced relation to said inner wall, said outer wall being formed with an opening aligned with said inner wall opening, removable cover means for said outer wall opening, valve means in said inner wall opening, stop means to prevent said valve means from moving through said inner wall opening in one direction beyond a predetermined position, means for retaining said valve means engaged with said stop means, said retaining means comprising adjustable urging means to urge said valve means towards said stop means, said cover means being formed with a central opening; and said retaining means including a portion slidably extending through said cover opening, said outer wall opening, and into the space between said outer and inner walls, said portion having one end engaging said valve means and the other end engaged by said urging means.

2. The combination of claim 1, said urging means being disposed on said cover means entirely on the side of said cover means opposite the space between said inner and outer walls.

3. The combination of claim 1, said urging means comprising a plate member engaged with said other end of said portion, a plurality of threaded studs rigidly connected to said cover means and projecting outwardly thereof, said studs engaging matching threaded openings in said plate member, and means engaged with said studs to urge said plate member into engagement with said other end of said portion.

4. The combination of claim 3, said portion of said retaining means comprising a smooth, elongated, cylindrical rod.

5. The combination of claim 1, said cover means being formed with an annular recess surrounding said cover opening in the side thereof opposite the space between said inner and outer walls, sealing means in said annular recess, and means for compressing said sealing means to provide a seal between said portion and said cover opening.

6. The combination of claim 5, said portion of said retaining means comprising a smaller, elongated, cylindrical rod.

7. The combination of claim 6, wherein said compressing means comprises a plate having a central opening receiving said rod, said means compressing said sealing means comprising an annular hub depending from said plate and into said annular recess to engage said sealing means, a plurality of threaded studs rigidly connected to said cover means and projecting outwardly therefrom through matching threaded openings in said plate, and means engaged with said studs for forcibly urging said annular hub into compressive engagement with said sealing means.

8. The combination of claim 1, wherein said urging means comprises a first plate member engaged with said other end of said portion, a plurality of threaded studs rigidly connected to said cover means and projecting outwardly thereof through matching threaded openings in said first plate member, a first plurality of nuts engaged with said threaded studs and said first plate member for forcibly urging said first plate member into engagement with said other end of said portion, said cover means being formed with an annular recess surrounding said cover opening in the side thereof opposite the space between said inner and outer walls, sealing means in said annular recess, means for compressing said sealing mans to provide a seal between said port said portion and said cover opening, said compressing means comprising a second plate member disposed between said first plate member and said cover means and formed with a clearance opening for said portion, said second plate member comprising an annular hub depending into said annular recess to engage said sealing means, said second plate member being formed with a plurality of matching threaded openings receiving said threaded studs, and a second plurality of nuts engaged with said threaded studs and said second plate member for forcibly urging said annular hub of said second plate member into compressive engagement with said sealing means.

9. The combination of claim 8, said portion of said retaining means comprising a smooth, elongated, cylindrical rod.

10. The combination of claim 5, said sealing means comprising chevron type packing material consisting of a polymerized fluorinated hydrocarbon plastic.

11. The combination of claim 8, said sealing means comprising chevron type packing material consisting of a polymerized fluorinated hydrocarbon plastic.

References Cited

UNITED STATES PATENTS 1,557,706  10/1925  Knox _____ 230—228
2,155,257  4/1939  Crittenden _____ 230—228 XR ROBERT M. WALKER, *Primary Examiner.*